United States Patent
Zhang et al.

(10) Patent No.: US 10,048,854 B2
(45) Date of Patent: Aug. 14, 2018

(54) DRAG AND DROP INTERACTION BETWEEN COMPONENTS OF A WEB APPLICATION

(75) Inventors: Hugh Zhang, Medford, MA (US); Teck Hua Lee, Belmont, CA (US); Kevin Chow, Wakefield, MA (US); Diar Ahmed, Walpole, MA (US); Prashant Singh, Burlington, MA (US)

(73) Assignee: ORACLE INTERNATIONAL CORPORATION, Redwood Shores ( * ) Notice: Subject to any disclaimer, the term of this patent is extended or adjusted under 35 U.S.C. 154(b) by 733 days.

(21) Appl. No.: 13/017,286

(22) Filed: Jan. 31, 2011

(65) Prior Publication Data

US 2012/0198374 A1 Aug. 2, 2012

(51) Int. Cl.
| | |
|---|---|
| *G06F 3/0486* | (2013.01) |
| *G06F 9/54* | (2006.01) |
| *G06F 3/0484* | (2013.01) |
| *G06F 9/448* | (2018.01) |

(52) U.S. Cl.
CPC ........ *G06F 3/0486* (2013.01); *G06F 3/04847* (2013.01); *G06F 9/4493* (2018.02); *G06F 9/542* (2013.01)

(58) Field of Classification Search
CPC .................................................... G06F 3/0486
USPC ................................................. 715/769, 739
See application file for complete search history.

(56) References Cited

U.S. PATENT DOCUMENTS

| | | | | |
|---|---|---|---|---|
| 5,146,556 A | * | 9/1992 | Hullot et al. | 715/790 |
| 5,530,865 A | * | 6/1996 | Owens | G06F 9/4443 |
| | | | | 715/203 |
| 5,543,591 A | * | 8/1996 | Gillespie | G06F 3/038 |
| | | | | 178/18.03 |

(Continued)

FOREIGN PATENT DOCUMENTS

JP 2012150756 A * 8/2012 ............. G06T 11/80

OTHER PUBLICATIONS

Oracle ADF 11g Primer, "Introduction to the building blocks of a Fusion Web application", an Oracle White Paper, Apr. 2007, pp. 1-12; http://www.oracle.com/technetwork/developer-tool/adf/learnmore/oracle-adf-11g-primer-154277.pdf.

(Continued)

*Primary Examiner* — Jeffrey A Gaffin
*Assistant Examiner* — John M Heffington
(74) *Attorney, Agent, or Firm* — Potomac Law Group, PLLC

(57) ABSTRACT

A user of a web application can perform a drag and drop operation from a first component of the web application to a second component of the web application. The drag and drop operation can include three actions. The first action can be initializing a drag of an object within a first component of a web application. The second action can be dragging the object from within the first component over a drop target located within a second component of the web application. The third action can be dropping the object onto the drop target located within the second component of the web application. One of the first and second components can be a web component, and the other component can be a visualization component. The first and second components of the web application can communicate with each other using a communication component of the web application.

18 Claims, 11 Drawing Sheets

(56) References Cited

U.S. PATENT DOCUMENTS

| | | | |
|---|---|---|---|
| 5,561,444 A * | 10/1996 | Johnston, Jr. | G06F 17/243 345/660 |
| 5,561,758 A * | 10/1996 | Hocker | G06F 3/0486 715/835 |
| 5,598,524 A * | 1/1997 | Johnston, Jr. | G06F 3/0486 715/769 |
| 5,621,878 A * | 4/1997 | Owens | G06F 3/0486 715/769 |
| 5,638,505 A * | 6/1997 | Hemenway | G06F 3/04812 715/769 |
| 5,706,502 A * | 1/1998 | Foley et al. | 717/120 |
| 5,754,178 A * | 5/1998 | Johnston, Jr. | G06F 9/4443 715/769 |
| 5,760,773 A * | 6/1998 | Berman | G06F 1/1626 345/672 |
| 5,767,851 A * | 6/1998 | Yee | G06F 3/0486 715/748 |
| 5,838,317 A * | 11/1998 | Bolnick | G06F 3/0481 707/999.007 |
| 5,874,943 A * | 2/1999 | Fitzpatrick | G06F 3/04892 345/159 |
| 5,907,327 A * | 5/1999 | Ogura | G06F 3/0486 345/173 |
| 6,002,871 A | 12/1999 | Duggan | |
| 6,008,811 A * | 12/1999 | McMillan | G06F 9/45512 715/769 |
| 6,025,844 A * | 2/2000 | Parsons | G06F 3/0481 707/E17.013 |
| 6,044,398 A | 3/2000 | Marullo | |
| 6,049,664 A * | 4/2000 | Dale et al. | 717/174 |
| 6,061,058 A * | 5/2000 | Owens | G06F 3/0486 715/769 |
| 6,157,940 A | 12/2000 | Marullo | |
| 6,212,577 B1 * | 4/2001 | Stern | G06F 9/4443 719/329 |
| 6,272,673 B1 * | 8/2001 | Dale et al. | 717/100 |
| 6,278,449 B1 * | 8/2001 | Sugiarto et al. | 715/826 |
| 6,406,062 B1 * | 6/2002 | Brooks | A63F 3/00697 273/138.1 |
| 6,437,800 B1 * | 8/2002 | Malamud et al. | 715/711 |
| 6,529,217 B1 * | 3/2003 | Maguire, III | G06F 17/246 345/440 |
| 6,584,569 B2 | 6/2003 | Reshef | |
| 6,701,514 B1 | 3/2004 | Haswell | |
| 6,907,546 B1 | 6/2005 | Haswell | |
| 6,993,712 B2 * | 1/2006 | Ramachandran et al. | 715/234 |
| 7,137,127 B2 * | 11/2006 | Slotznick | 719/329 |
| 7,237,265 B2 | 6/2007 | Reshef | |
| 7,295,953 B2 | 11/2007 | Cox | |
| 7,313,760 B2 * | 12/2007 | Grossman et al. | 715/708 |
| 7,360,172 B2 * | 4/2008 | Grossman et al. | 715/839 |
| 7,360,174 B2 * | 4/2008 | Grossman et al. | 715/854 |
| 7,412,349 B2 | 8/2008 | Moser | |
| 7,418,663 B2 * | 8/2008 | Pettinati et al. | 715/739 |
| 7,430,719 B2 * | 9/2008 | Pettinati et al. | 715/739 |
| 7,437,614 B2 | 10/2008 | Haswell | |
| 7,549,125 B2 * | 6/2009 | Dunn et al. | 715/739 |
| 7,577,700 B2 * | 8/2009 | Tolson et al. | 709/202 |
| 7,636,719 B2 * | 12/2009 | Thompson et al. | |
| 7,664,990 B2 | 2/2010 | Kodaka | |
| 7,739,604 B1 * | 6/2010 | Lyons | G06F 3/0486 709/213 |
| 7,765,248 B2 | 7/2010 | Kanasaki | |
| 7,802,191 B2 * | 9/2010 | Pettinati et al. | 715/739 |
| 7,802,230 B1 | 9/2010 | Mendicino | |
| 7,805,510 B2 | 9/2010 | Bansal | |
| 7,814,438 B2 * | 10/2010 | Grossman et al. | 715/854 |
| 7,861,171 B2 * | 12/2010 | Johanson | G06F 3/0486 715/733 |
| 7,953,759 B2 * | 5/2011 | Grossman et al. | 707/802 |
| 8,024,400 B2 * | 9/2011 | Lin | G06F 17/30905 709/203 |
| 8,082,513 B2 * | 12/2011 | Dai et al. | 715/769 |
| 8,195,711 B2 * | 6/2012 | Grossman et al. | 707/802 |
| 8,285,218 B2 | 10/2012 | Papakostas et al. | |
| 8,386,302 B1 | 2/2013 | Cohen et al. | |
| 8,402,157 B2 | 3/2013 | Krassner et al. | |
| 8,407,600 B2 * | 3/2013 | Pettinati et al. | 715/739 |
| 8,438,481 B2 | 5/2013 | Lau et al. | |
| 8,443,277 B2 | 5/2013 | Goldman et al. | |
| 8,458,605 B2 * | 6/2013 | Klask et al. | 715/763 |
| 8,463,630 B2 | 6/2013 | Hirose et al. | |
| 8,489,987 B2 * | 7/2013 | Erol | G06F 17/30247 707/722 |
| 8,495,236 B1 | 7/2013 | Glasser | |
| 8,497,883 B2 | 7/2013 | Ito | |
| 8,549,395 B2 * | 10/2013 | Graves | G06F 17/30905 715/234 |
| 8,643,736 B2 * | 2/2014 | Chu | H04L 67/2823 348/142 |
| 8,667,169 B2 * | 3/2014 | Patil | G06Q 30/02 370/229 |
| 8,700,072 B2 * | 4/2014 | Pascal | H04L 12/5835 345/660 |
| 8,832,541 B2 * | 9/2014 | Laskaris | G06F 17/2264 715/200 |
| 9,043,474 B2 * | 5/2015 | Schleifer | H04L 12/1818 709/227 |
| 9,201,965 B1 * | 12/2015 | Gannu | G06F 17/30867 |
| 2002/0002596 A1 * | 1/2002 | Sugiarto et al. | 709/218 |
| 2002/0075164 A1 * | 6/2002 | Iizuka | G06F 3/0486 340/870.16 |
| 2002/0112093 A1 * | 8/2002 | Slotznick | 709/329 |
| 2002/0120666 A1 | 8/2002 | Landsman et al. | |
| 2002/0129092 A1 * | 9/2002 | Tolson et al. | 709/202 |
| 2003/0066032 A1 * | 4/2003 | Ramachandran | G06F 3/04847 715/234 |
| 2003/0100999 A1 * | 5/2003 | Markowitz | G06F 19/28 702/20 |
| 2003/0184587 A1 * | 10/2003 | Ording | G06F 3/04817 715/769 |
| 2004/0100501 A1 * | 5/2004 | Dornback | 345/769 |
| 2004/0103364 A1 * | 5/2004 | Dornback | 715/501.1 |
| 2004/0194064 A1 | 9/2004 | Ranjan | |
| 2004/0199906 A1 * | 10/2004 | McKnight | G06F 17/30067 717/136 |
| 2005/0166159 A1 * | 7/2005 | Mondry | G06F 3/0486 715/769 |
| 2005/0193269 A1 | 9/2005 | Haswell | |
| 2006/0070007 A1 * | 3/2006 | Cummins | G06F 17/30398 715/769 |
| 2006/0101404 A1 | 5/2006 | Popp | |
| 2006/0181518 A1 * | 8/2006 | Shen | G06F 3/044 345/173 |
| 2006/0212790 A1 * | 9/2006 | Perantatos | G06F 3/0486 715/234 |
| 2006/0262105 A1 * | 11/2006 | Smith | G06F 3/0488 345/179 |
| 2007/0016872 A1 * | 1/2007 | Cummins | G06F 3/0486 715/769 |
| 2007/0186178 A1 * | 8/2007 | Schiller | G06F 3/0486 715/769 |
| 2007/0236509 A1 * | 10/2007 | Eldridge | G06F 3/0486 345/619 |
| 2007/0240080 A1 * | 10/2007 | Eldridge | G06F 3/0486 715/835 |
| 2007/0245238 A1 | 10/2007 | Fugitt et al. | |
| 2007/0288501 A1 * | 12/2007 | Estrada | G06F 17/243 |
| 2008/0065769 A1 * | 3/2008 | Curtis | G06F 9/542 709/226 |
| 2008/0209060 A1 | 8/2008 | Toumi et al. | |
| 2009/0030971 A1 * | 1/2009 | Trivedi | G06F 3/0486 709/203 |
| 2009/0055801 A1 | 2/2009 | Kodaka | |
| 2009/0172511 A1 | 7/2009 | Decherd et al. | |
| 2009/0217242 A1 * | 8/2009 | Banks | G06F 8/51 717/115 |
| 2009/0225030 A1 * | 9/2009 | Vaananen | G06F 3/0354 345/163 |
| 2009/0248838 A1 | 10/2009 | Presetenback et al. | |

(56) References Cited

U.S. PATENT DOCUMENTS

| | | | |
|---|---|---|---|
| 2009/0249239 A1* | 10/2009 | Eilers | 715/769 |
| 2010/0070896 A1* | 3/2010 | Attinger | G06F 17/212 715/765 |
| 2010/0162139 A1 | 6/2010 | Beebe | |
| 2010/0214243 A1* | 8/2010 | Birnbaum | G06F 3/016 345/173 |
| 2010/0274589 A1* | 10/2010 | Bauer | G06F 17/30914 705/3 |
| 2010/0277505 A1* | 11/2010 | Ludden | G06F 3/0416 345/634 |
| 2010/0325211 A1* | 12/2010 | Ylinen | G06F 9/4443 709/205 |
| 2011/0053513 A1 | 3/2011 | Papakostas et al. | |
| 2011/0185301 A1* | 7/2011 | Geller | G06F 3/0486 715/769 |
| 2011/0191165 A1* | 8/2011 | Kiseli | G06Q 30/0246 705/14.45 |
| 2012/0158719 A1* | 6/2012 | Gannu | G06F 17/2785 707/732 |
| 2013/0007786 A1 | 1/2013 | Papakostas et al. | |
| 2013/0047232 A1 | 2/2013 | Tuchman et al. | |
| 2013/0080785 A1 | 3/2013 | Ruhlen et al. | |
| 2013/0085840 A1 | 4/2013 | Andre | |
| 2013/0085854 A1 | 4/2013 | Masuko et al. | |
| 2013/0103796 A1 | 4/2013 | Fisher et al. | |
| 2013/0117653 A1 | 5/2013 | Sukhanov et al. | |
| 2013/0121599 A1 | 5/2013 | Shmouely et al. | |
| 2013/0122980 A1 | 5/2013 | Lachina et al. | |
| 2013/0124321 A1 | 5/2013 | Yamane et al. | |
| 2013/0144662 A1 | 6/2013 | Waring | |
| 2013/0154978 A1 | 6/2013 | Kim et al. | |
| 2013/0169669 A1 | 7/2013 | Chen et al. | |
| 2013/0171593 A1 | 7/2013 | Gorman et al. | |
| 2013/0171594 A1 | 7/2013 | Gorman et al. | |
| 2013/0176246 A1 | 7/2013 | Kohigashi et al. | |
| 2013/0198286 A1 | 8/2013 | Sarbaev et al. | |
| 2013/0204696 A1 | 8/2013 | Krassner et al. | |
| 2013/0212465 A1 | 8/2013 | Kovatch | |
| 2013/0216206 A1 | 8/2013 | Dubin et al. | |
| 2013/0218729 A1 | 8/2013 | Cranfill et al. | |
| 2013/0219269 A1 | 8/2013 | Cranfill et al. | |
| 2013/0219270 A1 | 8/2013 | Cranfill et al. | |
| 2013/0219321 A1 | 8/2013 | Cranfill et al. | |
| 2013/0219322 A1 | 8/2013 | Cranfill et al. | |

OTHER PUBLICATIONS

Adobe Flash Player, Copyright 2011 Adobe Systems Incorporated, 1 page; http://www.adobe.com/products/flashplayer/features.
Dynamic HTML, Jan. 25, 2011, pp. 1-5; http://en.wikipedia.org/wiki/Dynamic_HTML.
Conventional Drag-and-Drop, Jan. 25, 2011, pp. 1-3; http://en.wikipedia.org./wiki/Drag_and_drop.
Oracle Application Testing Suite 9.0 Supported with Oracle E-Business Suite, Jan. 25, 2011, pp. 1-7; http://blogs.oracle.com/stevenChan/2009/10/oats_ebs_certified.html.
Selenium, Jan. 24, 2011, 1 page; http://seleniumhq.org/about/how.html.
Flash-Selenium, Jan. 29, 2011, pp. 1-2; http://code.google/p/flash-selenium.
Batik, Java SVG Toolkit, Test Infrastructure, Jan. 28, 2011, pp. 1-5; http://xmlgraphics.apache.org/batik;dev/test.html.
Bing search, http://www.bing.com/search?q=web+component+visualization+component+modify Aug. 23, 2013.
Bing search, http://www.bing.com/search?q=web+component+visualization+component+communication Aug. 23, 2013.
Bing search, http://www.bing.com/search?q=web+component+visualization+component+display Aug. 23, 2013.
Tech Hua Lee, et al., U.S. Appl. No. 13/017,310, filed Jan. 31, 2011.

* cited by examiner

US 10,048,854 B2

DRAG AND DROP INTERACTION BETWEEN COMPONENTS OF A WEB APPLICATION

FIELD

One embodiment is directed to web applications, and more particularly, to web applications that display within a graphical user interface of a web browser.

BACKGROUND

In a computer graphical user interface, a "drag and drop" operation is an operation of (or support for an operation of) moving a cursor that is displayed within the graphical user interface, using a cursor control, onto a virtual object that is also displayed within the graphical user interface, and dragging the virtual object to a different location within the graphical user interface, or onto another virtual object displayed within the graphical user interface, using the cursor control. In general, a drag and drop operation can be used to invoke many kinds of actions, or create various types of associations between two virtual objects.

A web application is a computer software application that is accessed over a network, such as the Internet or an intranet. A web application also includes a computer software application that is hosted in a web browser-controlled environment (such as a Java® applet), or coded in a web browser-supported language (such as JavaScript), combined with a web browser-rendered markup language (such as Hypertext Markup Language ("HTML")). A web application is generally reliant upon a web browser that renders the web application executable.

While drag and drop operations are generally common in computer software applications, drag and drop operations are not common in web applications. This is because, in previous web applications, drag and drop operations between components of a web application (such as a web component and a visualization component) were difficult to implement due to technical differences between the components of the web application.

SUMMARY

One embodiment is directed to a computer-readable medium having instructions stored thereon that, when executed by a processor, cause the processor to perform a drag and drop operation in a web application displayed in a graphical user interface of a web browser. The instructions include initiating a drag of an object displayed within a first component of the web application in response to a first event received by the web application. The instructions further include dragging the object from within the first component over a drop target located within a second component of the web application in response to one or more second events received by the web application. The instructions further include dropping the object onto the drop target located within the second component of the web application in response to a third event received by the web application. One of the first and second components includes a web component, and the other component comprises a visualization component. The first and second components of the web application communicate with each other using a communication component of the web application.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

Figure 1:
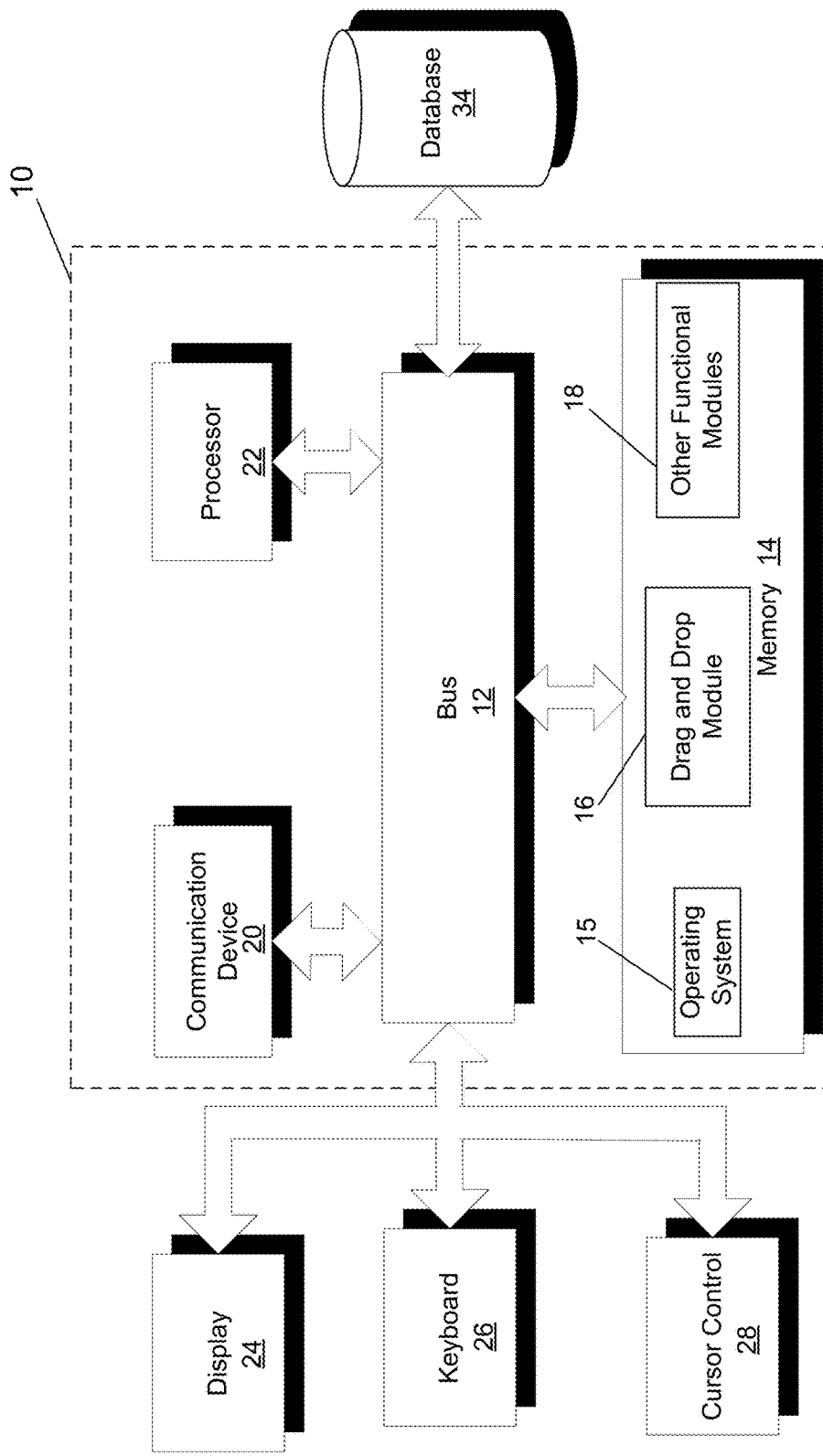
FIG. 1 illustrates a block diagram of a system that may implement an embodiment of the invention.

According to an embodiment, a user of a web application can perform a drag and drop operation from a web component of the web application (such as a Dynamic HTML component) to a visualization component of the web application (such as a Adobe Flash® component), and vice-versa. The web component and the visualization component of the web application can communicate with each other using a communication component (such as a JavaScript interface) of the web application. The communication component allows the web component to transmit and receive data from the visualization component (and vice-versa) in order to correctly display a object within the web application after the object is dragged and dropped onto a drop target located within the web application.

As previously described, a web application is a computer software application that is accessed over a network, such as the Internet or an intranet. In general, a web application is displayed on a graphical user interface of a web browser to a user. Examples of web browsers include an Internet Explorer® web browser, a Firefox® web browser, a Chrome® web browser, a Safari® web browser, and an Opera® web browser. A user of a web application is able to interact with the web application using a cursor control. Examples of cursor controls includes a computer mouse, an optical mouse, a touchpad, an optical touchpad, a trackball, a touchscreen, and a stylus.

A cursor control can be moved by the user. Such movement can include a single pressing down (or "click") of a cursor control button, a double pressing down (or "double click") of a cursor control button, a displacement of the cursor control to a different location while a cursor control button is pressed down, and a release of a cursor control button. A cursor control can send one or more events to the web application in response to a movement of the cursor control by the user. An event, as understood by one of ordinary skill in the relevant art, is a message that can be sent to a web application to indicate that an action has occurred, such as a movement of a cursor control. The web application can receive the one or more events sent by the cursor control and perform specified functionality based on the one or more events.

An example of the specified functionality, based on one or more events, is a manipulation of a virtual object ("object") of a web application that is represented by a visual icon displayed on the graphical user interface of the web browser by the web application. An object, as understood by one of ordinary skill in the relevant art, is an entity that comprises a value, variable, function, data structure, or compilation of values, variables, and functions that are encapsulated. According to the example, a user can move a cursor control, such as clicking on a cursor control button, which causes the cursor control to send one or more events to the web application. The web application receives the one or more events and modifies the visual icon that represents the object accordingly. For example, the web application can highlight the visual icon that represents the object in response to a user clicking on a cursor control button. According to an embodiment of the invention, a user can move a cursor control in order to cause the web application to drag and drop the visual icon that represents the object, as will be discussed in more detail.

Web applications can include more than one component. A component of a web application, as understood by one of ordinary skill in the relevant art, is a collection of software modules that can provide the web application with specific functionality for displaying content in a graphical user interface of a web browser when executed by a processor, where the collection of software modules can encapsulate a set of related functions, data, or a combination of the two. A component can refer to the collection of software modules and can also refer to the content displayed in the graphical user interface of the web browser by the software modules when executed by the processor. Web applications that include more than one component generally include, at least, a web component and a visualization component.

A web component is a component that provides functionality relating to how content of a web application, such as one or more objects of the web application, is displayed to a user in a graphical user interface of a web browser. The web component can include a static markup language (such as HTML) which is a hierarchical tag structure that can include specific text elements, such as headings, paragraphs, and lists, and can support hyperlinks and embedded images. The web component can also include a scripting language (such as JavaScript) that can control a behavior of the web browser. The web component can also include a presentation definition language (such as Cascading Style Sheets ("CSS")) that can control an appearance and layout of text and web content in the web application. The web component can also include a document object model ("DOM"), that can represent and interact with objects in the web application. Examples of web components include an HTML component, a Dynamic HTML ("DHTML") component, and an Extensible Hypertext Markup Language ("XHTML") component.

A visualization component is a component that provides functionality relating to displaying any type of visualization data, such as animation of text, drawings, and still images, as well as video, from within a web application. The visualization component can capture user input using a cursor control, a keyboard, an audio control, or a video control. Examples of cursor controls have previously been described. Examples of audio controls include a microphone, and examples of video controls include a camera. The visualization component can manipulate vector and raster graphics to display multimedia from within the web application. Examples of visualization components include an Adobe Flash® component, a Microsoft Silverlight® component, a Java® applet component, a Scalable Vector Graphics ("SVG") component, and a Synchronized Multimedia Integration Language ("SMIL") component.

According to an embodiment of the invention, a web application can display a web component and a visualization component within a graphical user interface of a web browser. According to one embodiment, the web component and the visualization component of the web application can be displayed adjacently within the graphical user interface of the web browser, so that the web component can be located in one portion of the graphical user interface, and the visualization component can be located in another portion of the graphical user interface.

According to an embodiment, a drag and drop operation between a web component and a visualization component utilizes a third component, a communication component, of a web application. A communication component is a component that provides functionality for facilitating communication between a web component and a visualization component of a web application. According to the embodiment, while not displayed in a graphical user interface of a web browser, the communication component can act as an interface between the web component and a visualization component, allowing the web component to communicate with the visualization component, by transmitting data to, and receiving data from, the visualization component, and vice-versa. This data allows the web application to correctly display an object that is dragged from a web component to a visualization component, within the visualization component. Likewise, this data allows the web application to correctly display an object that is dragged from a visualization component to a web component, within the web component.

As one of ordinary skill in the relevant art would appreciate, an interface is a point of interaction between two or more components. In one embodiment, a communication component is a JavaScript interface. However, this is merely an example, and, in alternate embodiments, a communication component can be any kind of interface.

FIG. 1 illustrates a block diagram of a system 10 that may implement one embodiment of the invention. System 10 includes a bus 12 or other communication mechanism for communicating information between components of system 10. System 10 also includes a processor 22, operatively coupled to bus 12, for processing information and executing instructions or operations. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of machine or computer-readable medium. System 10 further includes a communication device 20, such as a network interface card or other communication interface, to provide access to a network. As a result, a user may interface with system 10 directly, or remotely through a network or any other method.

A computer-readable medium may be any available medium that can be accessed by processor 22. A computer-readable medium may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Processor 22 can also be operatively coupled via bus 12 to a display 24, such as a Liquid Crystal Display ("LCD"). Display 24 can display information to the user. A keyboard 26 and a cursor control device 28, such as a computer mouse, can also be operatively coupled to bus 12 to enable the user to interface with system 10.

According to one embodiment, memory 14 can store software modules that may provide functionality when executed by processor 22. The modules can include an operating system 15, a drag and drop module 16, as well as other functional modules 18. Operating system 15 can provide an operating system functionality for system 10. Drag and drop module 16 can provide functionality for performing a drag and drop operation in a web application displayed in a graphical user interface of a web browser, as will be described in more detail below. System 10 can also be part of a larger system. Thus, system 10 can include one or more additional functional modules 18 to include the additional functionality. For example, functional modules 18 may include modules that are part of a development framework, such as the "Application Data Framework" product from Oracle Corporation.

Processor 22 can also be operatively coupled via bus 12 to a database 34. Database 34 can store data in an integrated collection of logically-related records or files. Database 34 can be an operational database, an analytical database, a data warehouse, a distributed database, an end-user database, an external database, a navigational database, an in-memory database, a document-oriented database, a real-time database, a relational database, an object-oriented database, or any other database known in the art.

Figure 2:
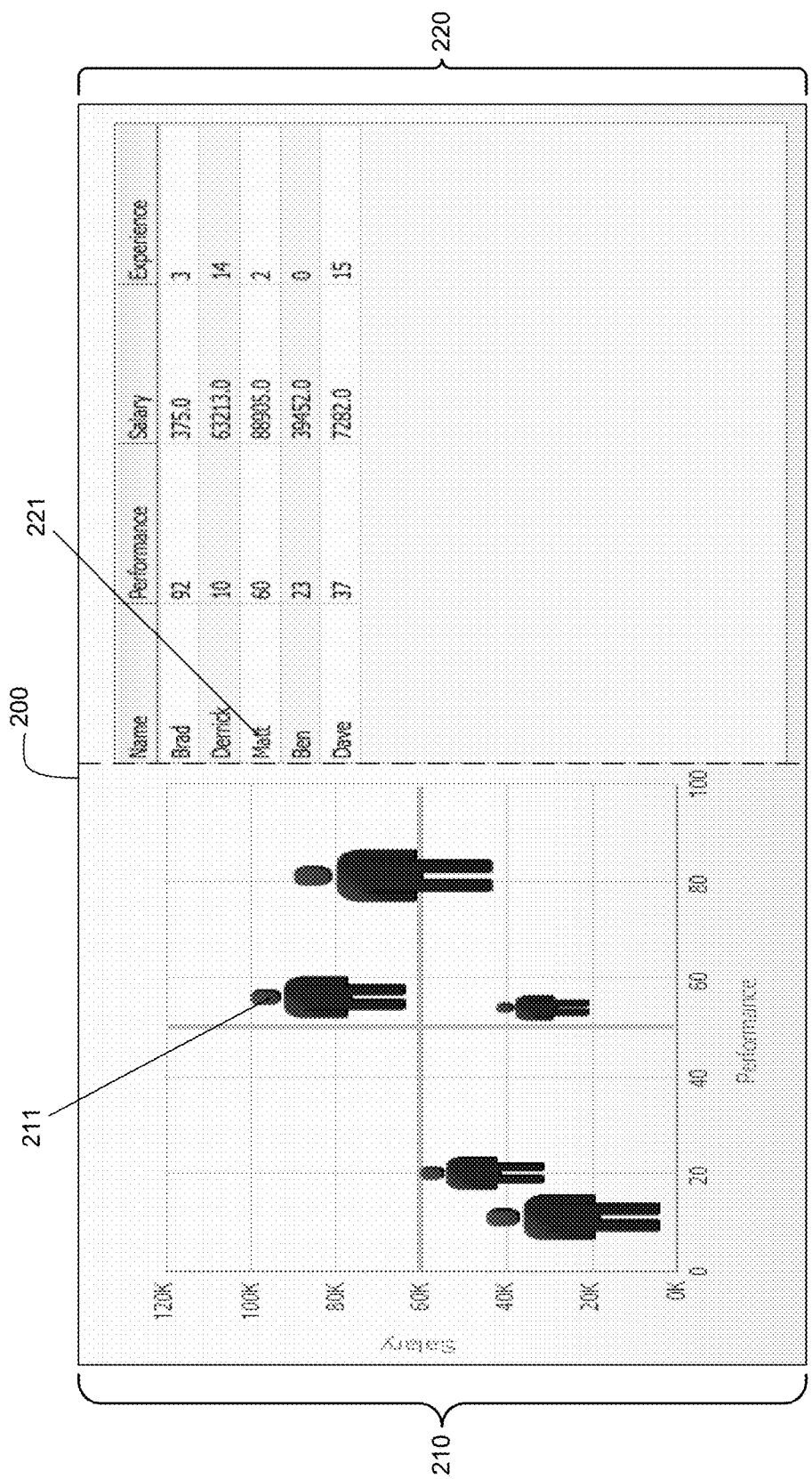
FIG. 2 illustrates a web application displayed in a graphical user interface of a web browser, where the web application includes a visualization component and a web component according to an embodiment of the invention.

FIG. 2 illustrates a web application 200 displayed in a graphical user interface of a web browser, where the web application includes a visualization component 210 and a web component 220 according to an embodiment of the invention. In the illustrated embodiment of FIG. 2, as well as the illustrated embodiments of FIGS. 3-9, a dotted line represents the boundary between visualization component 210 and web component 220. However, this dotted line is for illustration purposes, and one of ordinary skill in the relevant art would readily appreciate that in certain embodiments, no boundary is displayed between visualization component 210 and web component 220 in the graphical user interface. In one embodiment, visualization component 210 is an Adobe® Flash component. However, this is merely an example, and in alternate embodiments, visualization component 210 can be any kind of visualization component, such as the visualization components previously described. In the embodiment, web component 220 is a DHTML component. Similarly, this is merely an example, and in alternate embodiments, web component 220 can be any kind of web component, such as the web components previously described.

Visualization component 210 can display any type of visualization data. For example, visualization component 210 can display animation of text, drawings, and still images, and can display video, from within web application 200. In the illustrated embodiment of FIG. 2, visualization component 210 displays a bidirectional graph that includes visual icons representing employees of a company. However, this is merely an example embodiment, and visualization component 210 can display other types of visualization data in alternate embodiments. Furthermore, visualization component 210 can display visual icons within the graphical user interface of the web browser that represent objects of web application 200. An example of an object represented by a visual icon displayed by visualization component 210 is source object 211, as seen in the illustrated embodiment in FIG. 2. According to the embodiment, source object 211 is an object represented by a visual icon displayed by visualization component 210. As understood by one of ordinary skill in the relevant art, a reference to source object 211 refers to both the visual icon that is displayed in the graphical user interface and the underlying object that is represented by the visual icon. In the illustrated embodiment of FIG. 2, source object 211 represents an employee object and can include such data as name, performance, salary, and experience. However, this is only an example, and visualization component 210 can display any type of object in the graphical user interface. In an embodiment where visualization component 210 is an Adobe® Flash component, source object 211 is an object that inherits from a DisplayObject class.

According to an embodiment, web application 200 can receive one or more events sent by a cursor control that is moved by a user, and can manipulate an object that is represented by a visual icon displayed within visualization component 210. For example, web application 200 can manipulate source object 211 in response to one or more events sent by a cursor control that is moved by the user. An example of an manipulation of source object 211 is a displacement of a position of source object 211 within visualization component 210.

Web component 220 can display any type of content from within web application 200. In the illustrated embodiment of FIG. 2, web component 220 displays a spreadsheet that includes records representing employees of a company. However, this is merely an example embodiment, and web component 220 can display other types of content in alternative embodiments. Furthermore, web component 220 can display visual icons within the graphical user interface of the web browser that represents objects of web application 200. An example of an object displayed by web component 220 is source object 221, as seen in the illustrated embodiment in FIG. 2. As understood by one of ordinary skill in the relevant art, a reference to source object 221 refers to both the visual icon that is displayed in the graphical user interface and the underlying object that is represented by the visual icon. In FIG. 2, source object 221 represents an employee object and can include such data as name, performance, salary, and experience. However, this is only an example, and web component 220 can display any type of object.

According to an embodiment, web application 200 can also receive one or more events sent by a cursor control, where the cursor control is moved by a user, and manipulate an object that is represented by a visual icon displayed within web component 220. For example, web application 200 can manipulate source object 221 in response to one or more events sent by a cursor control that is moved by the user. An example of an manipulation of source object 221 is a displacement of a position of source object 221 within web component 220.

According to an embodiment, web application 200 includes a communication component (not shown) and visualization component 210 and web component 220 can communicate with each other using the communication component of web application 200. As previously described, a communication component is a component that can transmit data from visualization component 210 to web component 220, and from web component 220 to visualization component 210.

Figure 3:
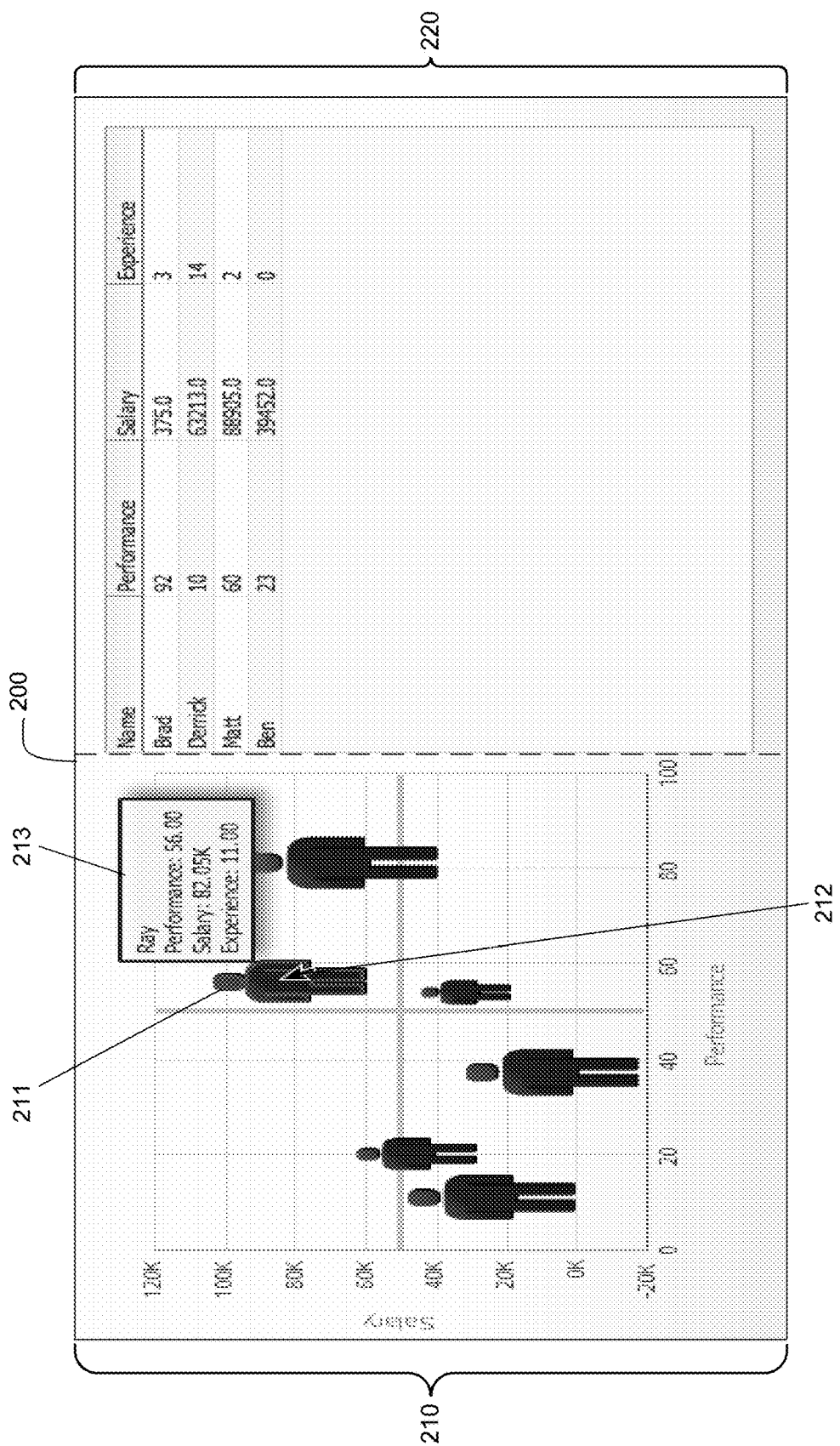
FIG. 3 illustrates a web application displayed in a graphical user interface of a web browser before an initiation of a drag operation within a visualization component according to an embodiment of the invention.

FIG. 3 illustrates web application 200 displayed in a graphical user interface of a web browser before an initiation of a drag operation within visualization component 210 according to an embodiment of the invention. According to the embodiment, a user can initiate a drag operation of source object 211 within visualization component 210. In one embodiment, a user can initiate the drag operation of source object 211 by moving a cursor control (not shown), where the movement of the cursor control sends an event to web application 200. Web application 200 can display icon 212 (i.e., arrow 212) on the graphical user interface of the web browser, where icon 212 represents a position of the cursor control. In accordance with the embodiment, the movement of the cursor control can include a pressing down of a button of the cursor control, where icon 212 is displayed over source object 211 in the graphical user interface of the web browser.

Before receiving an event from the cursor control, according to the embodiment, web application 200 can detect source object 211 as being under icon 212, and can create and display additional context object 213 within the graphical user interface of the web browser, where additional context object 213 includes additional context of source object 211. Additional context can include data associated with an object, such as source object 211. In the illustrated embodiment, additional context object 213 includes data associated with source object 211, such as name, performance, salary, and experience. However, this is only an example, and additional context can include any type of data associated with an object. Upon receiving an event from the cursor control, according to the embodiment, web application can create a data payload object (not shown), where the data payload object includes a data payload of source object 211. Similar to additional context, a data payload can include data associated with an object, such as source object 211. In the illustrated embodiment, similar to additional context object 213, the data payload object includes data associated with source object 211, including name, performance, salary and experience.

Figure 4:
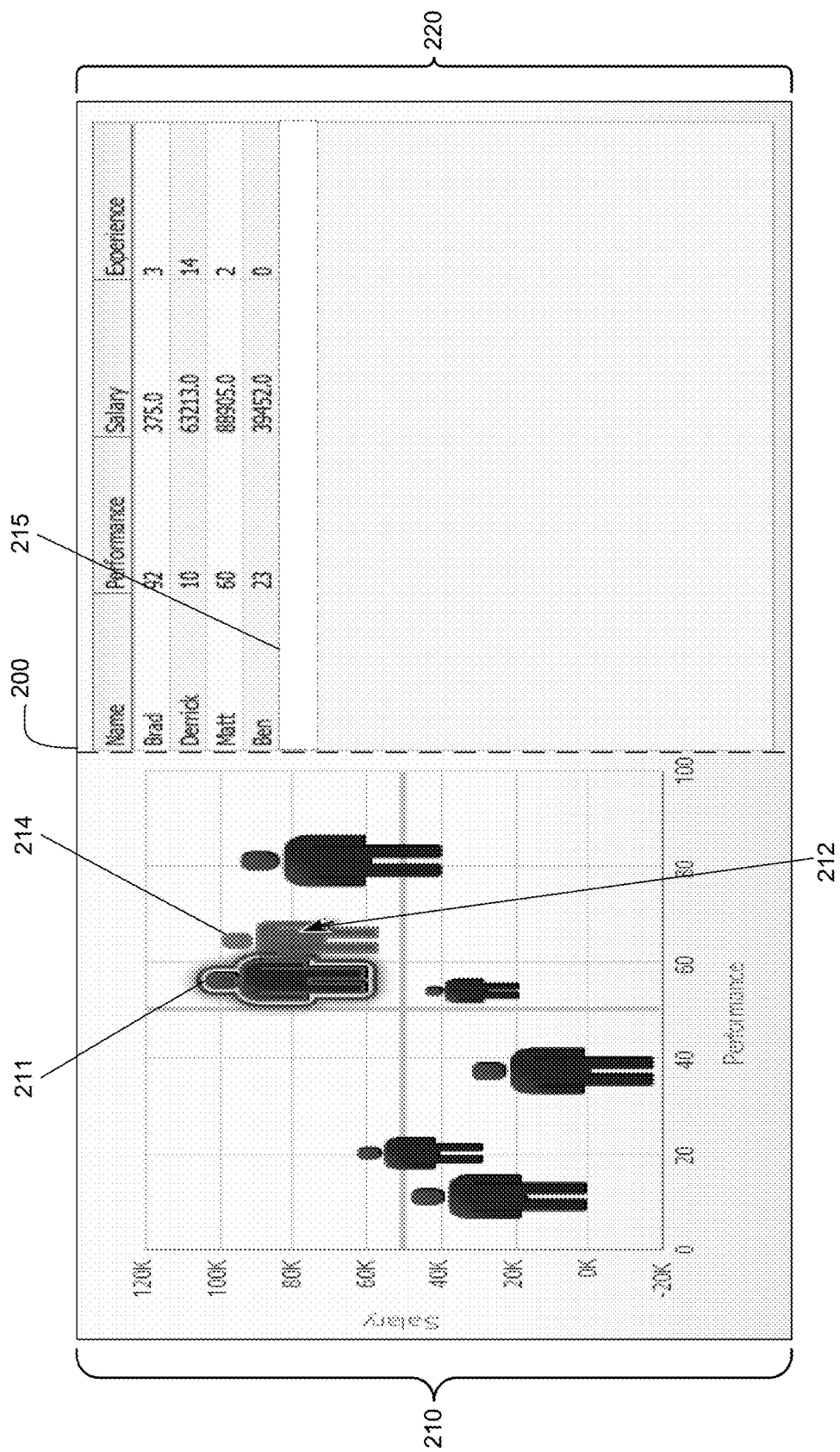
FIG. 4 illustrates a web application displayed in a graphical user interface of a web browser after an initiation of a drag operation within a visualization component according to an embodiment of the invention.

FIG. 4 illustrates web application 200 displayed in a graphical user interface of a web browser after an initiation of a drag operation within visualization component 210 according to an embodiment of the invention. According to the embodiment, upon an initiation of a drag operation of source object 211 within visualization component 210, web application 200 creates and displays visual feedback object 214 on the graphical user interface of the web browser, where visual feedback object 214 includes information used to display source object 211 during a drag of source object 211. The creation and display of visual feedback object 214 involves transmitting data associated with source object from visualization component 210 to web component 220 utilizing a communication component, as will now be described in more detail.

Similar to FIG. 3, web application 200 can display icon 212 on the graphical user interface of the web browser, where icon 212 represents a position of the cursor control, and where a position of visual feedback object 214 can correspond to a position of icon 212, in accordance with one embodiment of the invention. In the illustrated embodiment of FIG. 4, drop target 215 represents a drop target of source object 211, where a drop target is an intended target of a drag and drop operation. As shown in FIG. 4, drop target 215 is located within web component 220.

According to an embodiment, web application 200 can create visual feedback object 214 using a communication component. More specifically, in one embodiment, web application 200 can convert source object 211, which is an object within visualization component 210, into a bitmap object and transfer the bitmap object to web component 220 using the communication component to create visual feedback object 214. In accordance with this embodiment, feedback object 214 is embedded within web application 200 until a drop operation occurs. Until the drop operation occurs, web application 200 polls the component under icon 212 (either visualization component 210 or web component 220) to determine whether a drop operation is possible. In one embodiment, the bitmap object is an inline image. The inline image can be a base 64 Portable Network Graphics ("PNG") image in accordance with the embodiment. Visual feedback object 214 can be created using the aforementioned technique when the web browser that displays web application 200 is a Firefox® web browser, a Chrome® web browser, a Safari® web browser, and an Opera® web browser. In addition, the inline image can be displayed in the previously listed browsers by setting the inline image to be a source of an image tag, as shown in the following example pseudocode: <img src="inline image contents here"/>. The communication component can be a JavaScript interface in accordance with an embodiment of the invention.

According to an alternate embodiment, web application 200 can convert source object 211 into an encoded string, create a second visualization component (not shown), that is displayed over visualization component 210, and transfer the encoded string into the second visualization component, which renders visual feedback object 214, using the communication component. In one embodiment, the encoded string can be a string that describes data payload properties of source object 211. In the embodiment, the second visualization component can decode the encoded string to obtain visual feedback object 214. The second visualization component can then display visual feedback object 214. Visual feedback object 214 can be created using the aforementioned technique when the web browser that displays web application 200 is an Internet Explorer® web browser. The communication component can be a JavaScript interface in accordance with an embodiment of the invention.

Thus, according to the embodiment, after the initiation of a drag operation within visualization component 210, web application 200 can create visual feedback object 214 within web component 220, where visual feedback object 214 includes information used to display source object 211. In one embodiment of the invention, web application 200 can display visual feedback object 214 on the graphical user interface of the web browser using an identical visual icon as source object 211.

Figure 5:
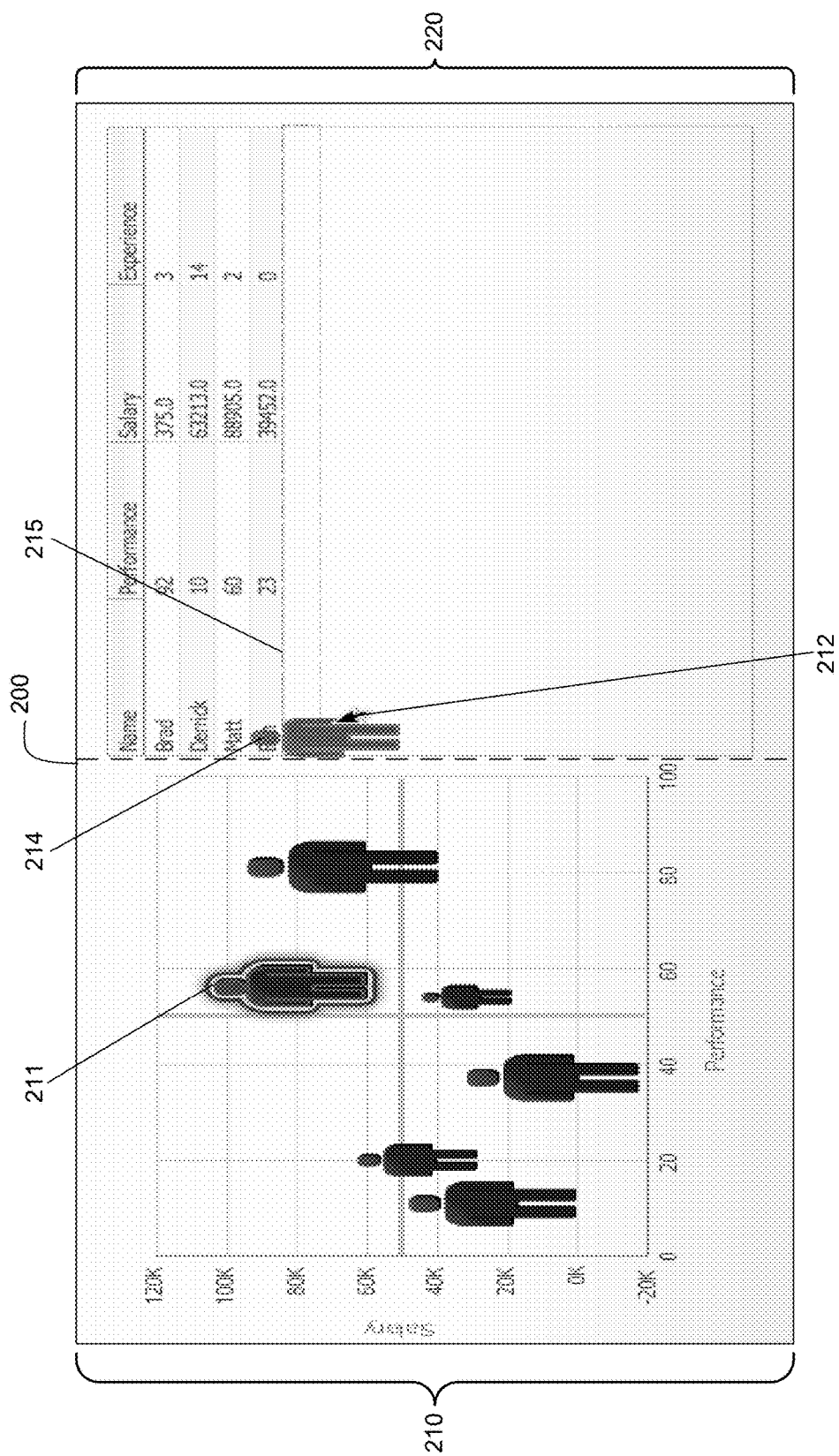
FIG. 5 illustrates a drag operation from a visualization component to a web component of a web application displayed in a graphical user interface of a web browser according to an embodiment of the invention.

FIG. 5 illustrates a drag operation from visualization component 210 to web component 220 of web application 200 displayed in a graphical user interface of a web browser according to an embodiment of the invention. According to the embodiment, a user can drag source object 211 from within visualization component 210 to web component 220 of web application 200. According to the embodiment, a position of source object 211 remains static within the graphical user interface of the web browser, whereas a position of visual feedback object 214 changes as visual feedback object 214 is dragged from within visualization component 210 to drop target 215 within web component 220. This action can be referred to as either a drag of source object 211 or a drag of visual feedback object 214, as visual feedback object 214 represents source object 211. As previously described, feedback object 214 is embedded within web application 200 until a drop operation occurs.

In one embodiment, a user can drag source object 211 by moving a cursor control (not shown), where the movement of the cursor control sends one or more events to web application 200. Similar to FIG. 4, web application 200 can display icon 212 on the graphical user interface of the web browser, where icon 212 represents a position of the cursor control. In accordance with the embodiment, the movement of the cursor control can include a displacement of the cursor control to a different location while a cursor control button is pressed down, and where web application 200 can update the position of icon 212 and visual feedback object 214 within the graphical user interface of the web browser based on the position of the cursor control.

According to the embodiment, upon receiving each event of the one or more events sent by the cursor control, web application 200 updates the position of icon 212 and visual feedback object 214 displayed within the graphical user interface of the web browser. Web application 200 can update the position of icon 212 and visual feedback object 214 based on the movement of the cursor control, which is transmitted within each event of the one or more events. In one embodiment, each event of the one or more events sent by the cursor control can represent a displacement of the cursor control that is equal to at least one pixel of the graphical user interface displayed in the web browser. Thus, in the embodiment, the one or more events sent by the cursor control can represent a total displacement of the cursor control that is used to drag visual feedback object 214 from within visualization component 210 to drop target 215 within web component 220. Therefore, web application 200 can continuously update the position of icon 212 and visual feedback object 214 in response to the one or more events sent by the cursor control. Web application 200 can continuously update the position of visual feedback object 214 regardless of whether visual feedback object 214 is displayed over visualization component 210 or web component 220 due to the previous transfer of either a bitmap object or a string from visualization component 210 to web component 220 over the communication component.

In accordance with one embodiment, throughout a drag of visual feedback object 214, after updating the position of icon 212 and visual feedback object 214, web application 200 determines whether it can accept a drop of visual feedback object 214, which represents source object 211, at a current position of visual feedback object 214. Thus, web application 200 can continuously determine whether it can accept a drop of visual feedback object 214 at its current position in response to the one or more events sent by the cursor control. In one embodiment, web application 200 determines whether it can accept a drop of visual feedback object 214 at its current position based on a data payload of source object 211. Web application 200 can continuously determine whether it can accept a drop of visual feedback object 214 at its current position regardless of whether visual feedback object 214 is displayed over visualization component 210 or web component 220 due to the previous transfer of either a bitmap object or a string from visualization component 210 to web component 220 over the communication component.

According to the embodiment, web application 200 can display additional visual feedback within the graphical user interface of the web browser based on whether web application 200 can accept a drop of visual feedback object 214 at its current position. If web application 200 can accept a drop of visual feedback object 214 at its current position, then web application 200 can display additional positive visual feedback within the graphical user interface of the web browser. An example of additional positive visual feedback is a highlighted region around visual feedback object 214. However, this is only an example of additional positive visual feedback that can be displayed within the graphical user interface of the web browser, and any visual icon or image can be displayed within the graphical user interface. If web application 200 cannot accept a drop of visual feedback object 214 at its current position, then web application 200 can display additional negative visual feedback. An example of additional negative visual feedback is a circle with a slash that is adjacent to visual feedback object 214. However, this is only an example of additional negative visual feedback that can be displayed within the graphical user interface of the web browser, and any visual icon or image can be displayed within the graphical user interface.

Figure 6:
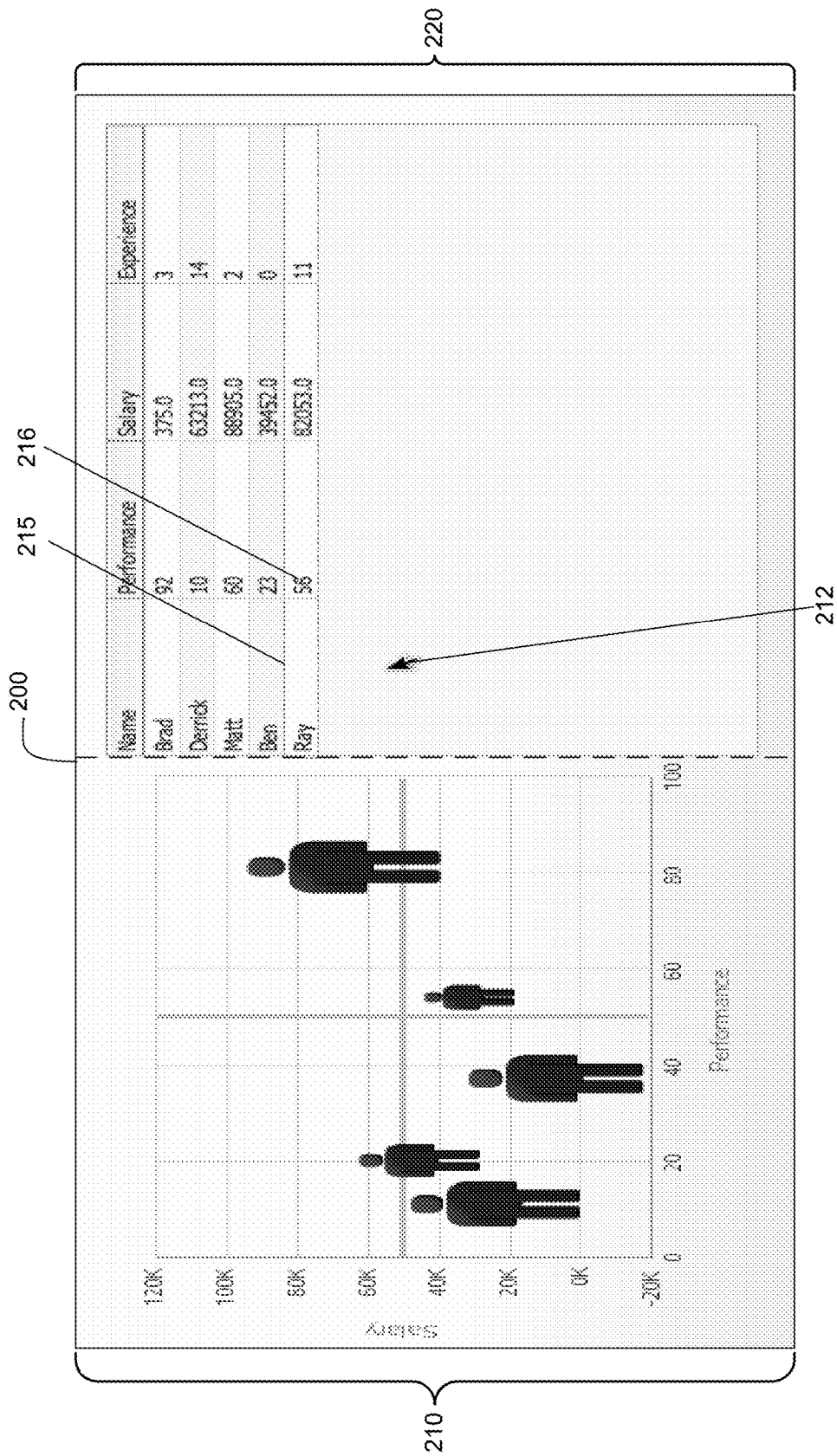
FIG. 6 illustrates a drop operation within a web component of a web application displayed in a graphical user interface of a web browser according to an embodiment of the invention.

FIG. 6 illustrates a drop operation within web component 220 of web application 200 displayed in a graphical user interface of a web browser according to an embodiment of the invention. According to the embodiment, a user can perform a drop operation of source object 211 within drop target 215 of web component 220. In one embodiment, a user can perform the drop operation of source object 211 by moving a cursor control (not shown), where the movement of the cursor control sends an event to web application 200. In accordance with the embodiment, the movement of the cursor control can include a release of a button of the cursor control.

Upon receiving an event from the cursor control, according to the embodiment, web application 200 determines whether drop target 215 can accept a drop of visual feedback object 214, which represents source object 211. In one embodiment, web application 200 determines whether drop target 215 can accept a drop of visual feedback object 214 based on a data payload of source object 211. If web application 200 can accept a drop of visual feedback object 214 at drop target 215, then, in the embodiment, a data payload of source object 211 is transferred to drop target 215, the displaying of source object 211 and visual feedback object 214 is cancelled so that source object 211 and visual feedback object 214 are no longer displayed in the graphical user interface of the web browser, and target object 216 is displayed within web component 220 in the graphical user interface, as seen in the illustrated embodiment of FIG. 6. This action can be referred to as either a drop of source object 211 or a drop of visual feedback object 214, as visual feedback object 214 represents source object 211.

According to the embodiment, a data payload of source object 211 is used to display target object 216 within web component 220 using a format specified by web component 220, and the target object 216 has a distinct appearance as compared to visual feedback object 214, which is displayed using a format specified by visualization component 210. For example, as illustrated in FIG. 6, target object 216 is displayed as a spreadsheet record that represents an employee of a company, rather than a visual icon that represents the employee. As can be seen in the illustrated embodiment of FIG. 6, target object 216 includes a data payload of source object 211, and thus, is similar to source object 211. However, target object 216 is displayed within web component 220 in the graphical user interface.

However, if web application 200 cannot accept a drop of visual feedback object 214 at drop target 215, then, in the embodiment, the drag operation of source object 211 is cancelled. According to the embodiment, when the drag operation of source object 211 is cancelled, source object 211 remains displayed within visualization component 210 in the graphical user interface of the web browser, and the displaying of visual feedback object 214 is cancelled so that visual feedback object 214 is no longer displayed in the graphical user interface.

Figure 7:
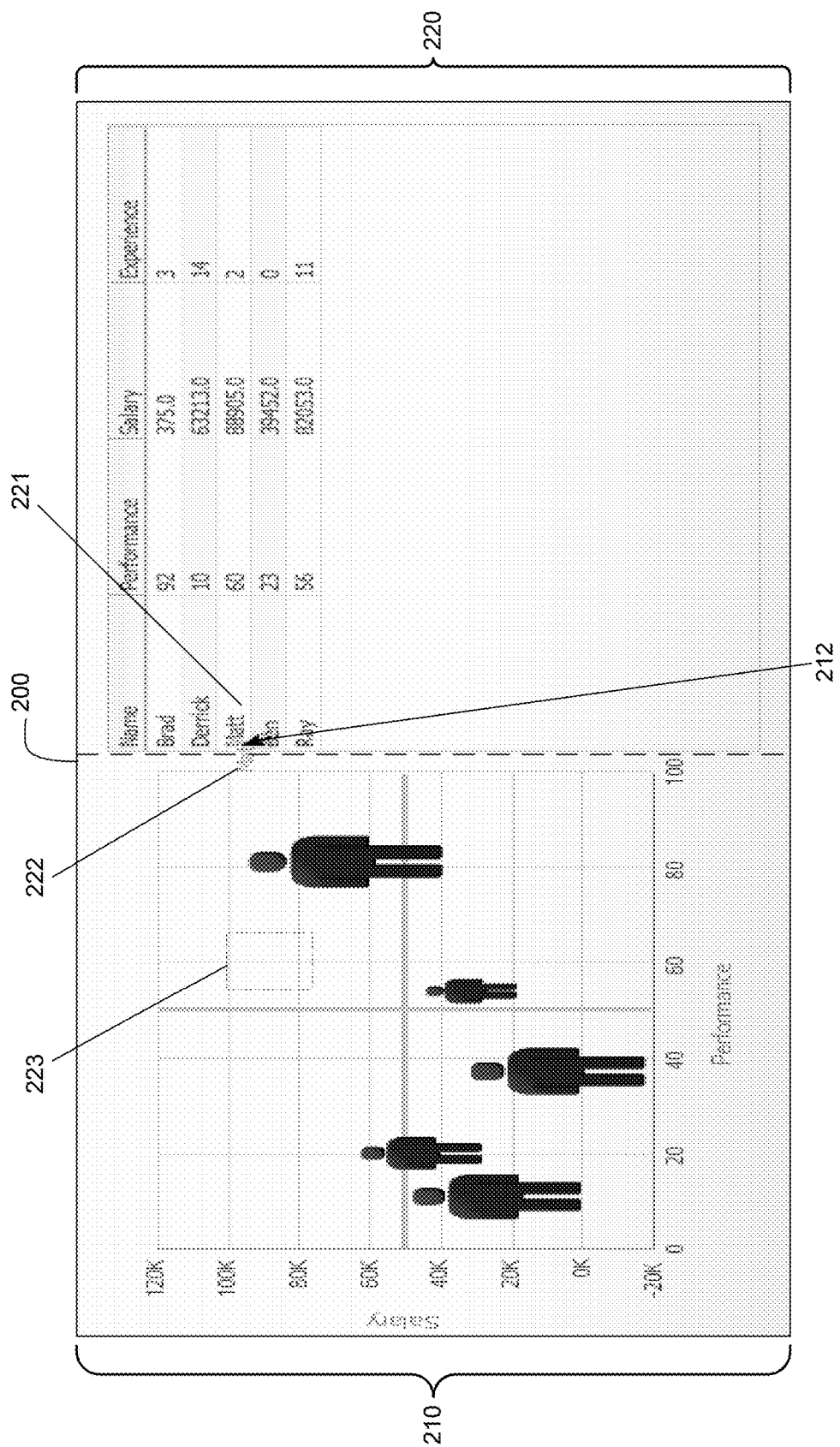
FIG. 7 illustrates an initiation of a drag operation within a web component of a web application displayed in a graphical user interface of a web browser according to an embodiment of the invention.

FIG. 7 illustrates an initiation of a drag operation within web component 220 of web application 200 displayed in a graphical user interface of a web browser according to an embodiment of the invention. According to the embodiment, a user can initiate a drag operation of source object 221 within web component 220. In one embodiment, a user can initiate the drag operation of source object 221 by moving a cursor control (not shown), where the movement of the cursor control sends an event to web application 200. Web application 200 can display icon 212 on the graphical user interface of the web browser, where icon 212 represents a position of the cursor control. In accordance with the embodiment, the movement of the cursor control can include a pressing down of a button of the cursor control, where icon 212 is displayed over object 221 in the graphical user interface of the web browser.

According to the embodiment, upon an initiation of a drag operation of source object 221 within web component 220, web application 200 creates and displays visual feedback object 222 within web component 220 on the graphical user interface of the web browser. Because both source object 221 and visual feedback object 222 are both within web component 220, a communication component is not used to create visual feedback object 222. In one embodiment, visual feedback object 222 can be a copy of source object 221. According to the embodiment, a position of visual feedback object 222 can correspond to a position of icon 212. In the illustrated embodiment of FIG. 7, drop target 223 represents a drop target of source object 221, where a drop target is an intended target of a drag and drop operation. As shown in FIG. 7, drop target 223 is located within visualization component 210.

Figure 8:
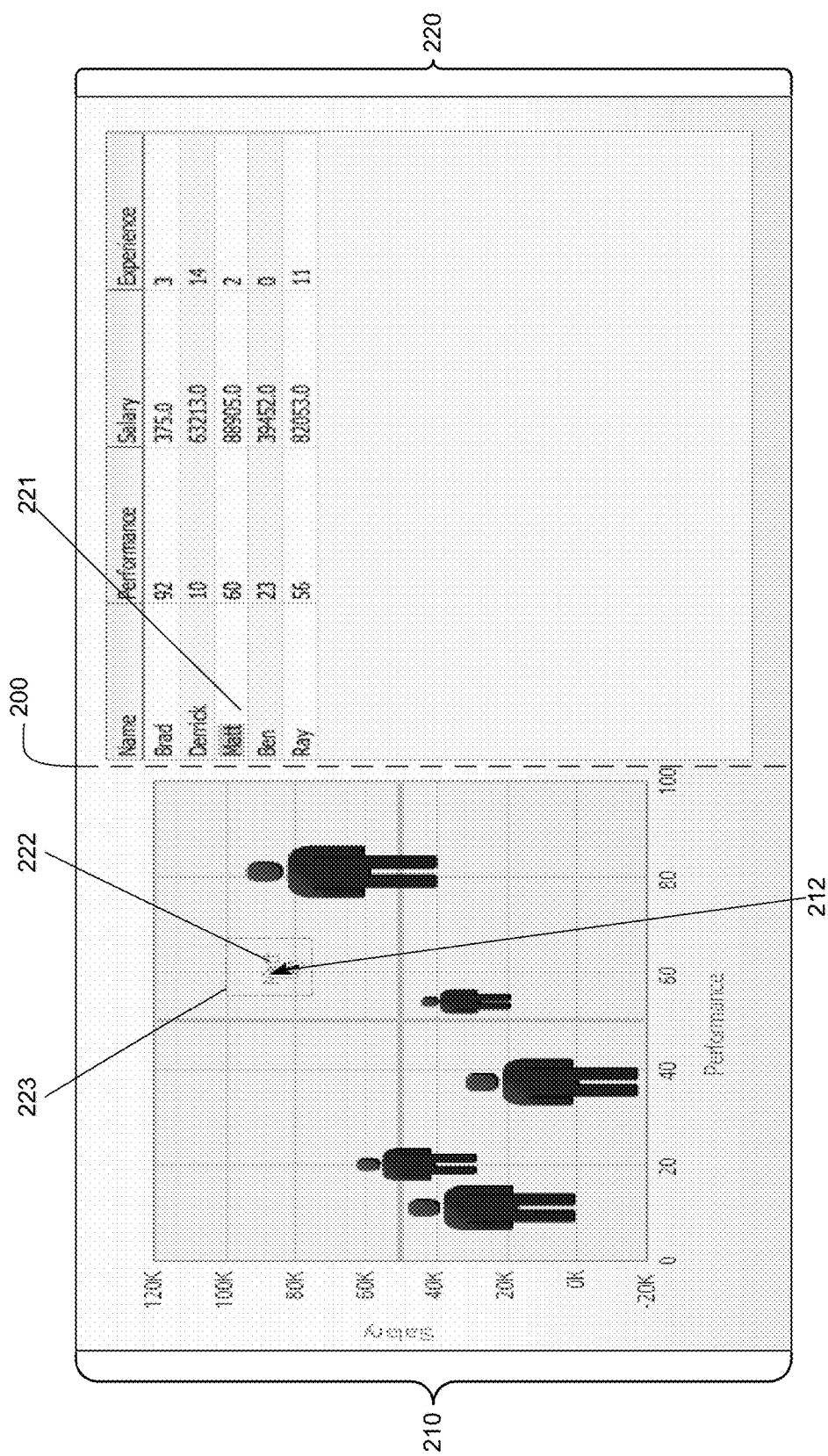
FIG. 8 illustrates a drag operation from a web component to a visualization component of a web application displayed in a graphical user interface of a web browser according to an embodiment of the invention.

FIG. 8 illustrates a drag operation from web component 220 to visualization component 210 of web application 200 displayed in a graphical user interface of a web browser according to an embodiment of the invention. According to the embodiment, a user can drag source object 221 from within web component 220 to visualization component 210 of web application 200. According to the embodiment, a position of source object 221 remains static within the graphical user interface of the web browser, whereas a position of visual feedback object 222 changes as visual feedback object 222 is dragged from within web component 220 to drop target 223 within visualization component 210. This action can be referred to as either a drag of source object 221 or a drag of visual feedback object 222, as visual feedback object 222 represents source object 221.

In one embodiment, a user can drag source object 221 by moving a cursor control (not shown), where the movement of the cursor control sends one or more events to web application 200. Similar to FIG. 7, web application 200 can display icon 212 on the graphical user interface of the web browser, where icon 212 represents a position of the cursor control. In accordance with the embodiment, the movement of the cursor control can include a displacement of the cursor control to a different location while a cursor control button is pressed down, and where web application 200 can update the position of icon 212 and visual feedback object 222 within the graphical user interface of the web browser based on the position of the cursor control.

According to the embodiment, upon receiving each event of the one or more events sent by the cursor control, web application 200 updates the position of icon 212 and visual feedback object 222 displayed within the graphical user interface of the web browser. Web application 200 can update the position of icon 212 and visual feedback object 222 based on the movement of the cursor control, which is transmitted within each event of the one or more events. In one embodiment, each event of the one or more events sent by the cursor control can represent a displacement of the cursor control that is equal to at least one pixel of the graphical user interface displayed in the web browser. Thus, in the embodiment, the one or more events sent by the cursor control can represent a total displacement of the cursor control that is used to drag visual feedback object 222 from within web component 220 to drop target 223 within visualization component 210. Therefore, web application 200 can continuously update the position of icon 212 and visual feedback object 222 in response to the one or more events sent by the cursor control.

In accordance with one embodiment, throughout a drag of visual feedback object 222, after updating the position of icon 212 and visual feedback object 222, web application 200 determines whether it can accept a drop of visual feedback object 222, which represents source object 221, at a current position of visual feedback object 222. Thus, web application 200 can continuously determine whether it can accept a drop of visual feedback object 222 at its current position in response to the one or more events sent by the cursor control. In one embodiment, web application 200 determines whether it can accept a drop of visual feedback object 222 at its current position based on a data payload of source object 221.

In one embodiment, when a position of visual feedback object 222 is within visualization component 210, web application 200 utilizes a communication component (not shown) in order to determine whether web application 200 can accept a drop of visual feedback object 222 at a location within visualization component 210. As previously described, a communication component is a component that can transmit data from visualization component 210 to web component 220, and from web component 220 to visualization component 210. In one embodiment, web application 200 can transmit data from web component 220 to visualization component 210, using the communication component, to determine whether web application 200 can accept a drop of visual feedback object 222 at a location within visualization component 210. Such data can include a data payload of source object 221, in accordance with one embodiment of the invention. According to an embodiment, the communication component can be a JavaScript interface.

According to the embodiment, web application 200 can display additional visual feedback within the graphical user interface of the web browser based on whether web application 200 can accept a drop of visual feedback object 222 at its current position. If web application 200 can accept a drop of visual feedback object 222 at its current position, then web application 200 can display additional positive visual feedback within the graphical user interface of the web browser. An example of additional positive visual feedback is a highlighted region around visual feedback object 222. However, this is only an example of additional positive visual feedback that can be displayed within the graphical user interface of the web browser, and any visual icon or image can be displayed within the graphical user interface. If web application 200 cannot accept a drop of visual feedback object 222 at its current position, then web application 200 can display additional negative visual feedback. An example of additional negative visual feedback is a circle with a slash that is adjacent to visual feedback object 222. However, this is only an example of additional negative visual feedback that can be displayed within the graphical user interface of the web browser, and any visual icon or image can be displayed within the graphical user interface.

In one embodiment, when a position of visual feedback object 222 is within visualization component 210, web application 200 utilizes a communication component (not shown) in order to display additional visual feedback within visualization component 210. In one embodiment, web application 200 can transmit data from web component 220 to visualization component 210, using the communication component, to display additional visual feedback within visualization component 210. Such data can include a visual icon or image to display within visualization component 210, in accordance with one embodiment of the invention. According to an embodiment, the communication component can be a JavaScript interface.

Figure 9:
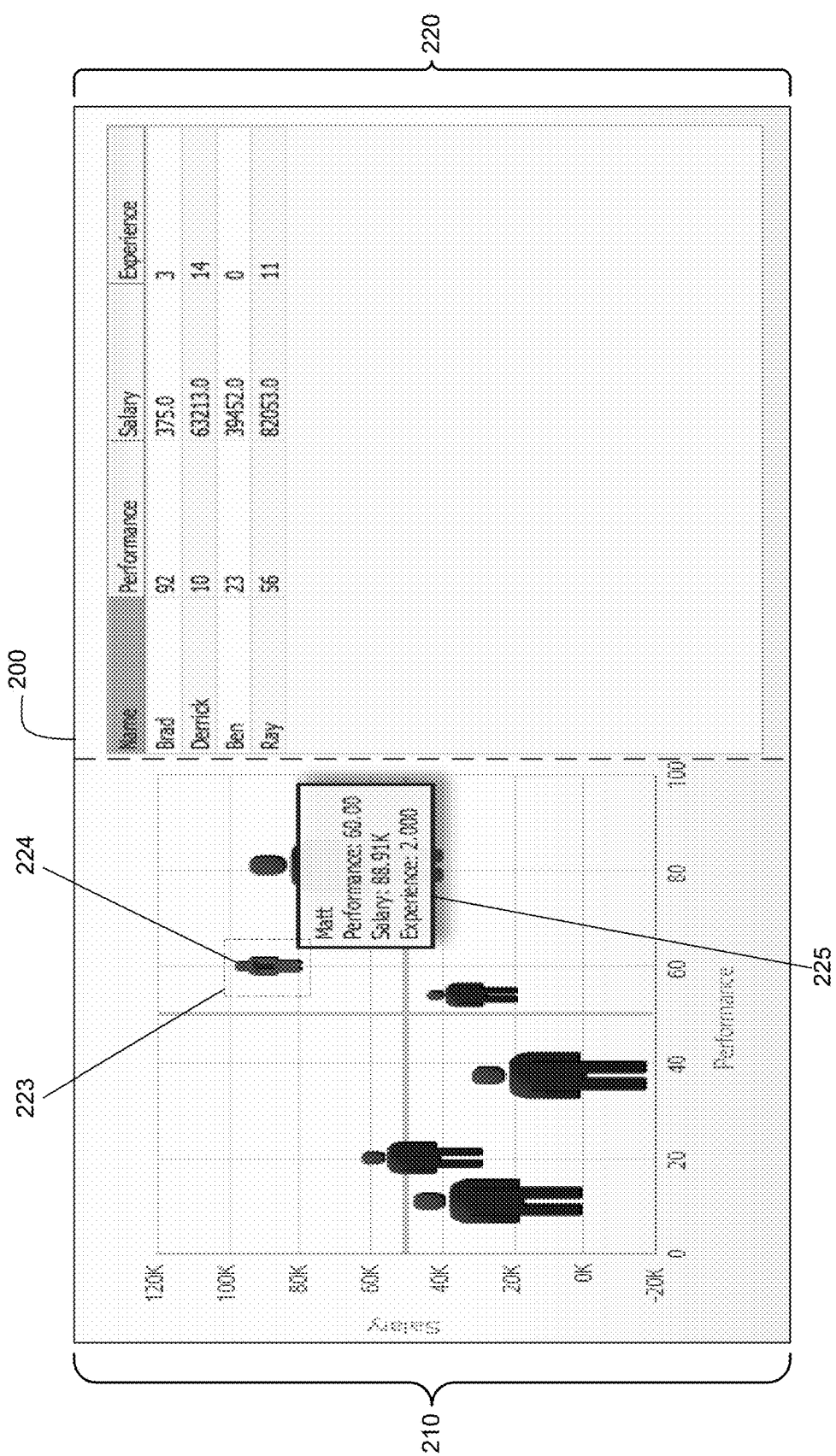
FIG. 9 illustrates a drop operation within a visualization component of a web application displayed in a graphical user interface of a web browser according to an embodiment of the invention.

FIG. 9 illustrates a drop operation within visualization component 210 of web application 200 displayed in a graphical user interface of a web browser according to an embodiment of the invention. According to the embodiment, a user can perform a drop operation of source object 221 within drop target 223 of visualization component 210. In one embodiment, a user can perform the drop operation of source object 221 by moving a cursor control (not shown), where the movement of the cursor control sends an event to web application 200. In accordance with the embodiment, the movement of the cursor control can include a release of a button of the cursor control.

Upon receiving an event from the cursor control, according to the embodiment, web application 200 determines whether drop target 223 can accept a drop of visual feedback object 222, which represents source object 221. In one embodiment, web application 200 determines whether drop target 223 can accept a drop of visual feedback object 222 based on a data payload of source object 221. If web application 200 can accept a drop of visual feedback object 222 at drop target 223, then a data payload of source object 221 is transferred to drop target 223, the displaying of source object 221 and visual feedback object 222 is cancelled so that source object 221 and visual feedback object 222 are no longer displayed in the graphical user interface of the web browser, and target object 224 is displayed within visualization component 210 in the graphical user interface, as seen in the illustrated embodiment of FIG. 9. This action can be referred to as either a drop of source object 221 or a drop of visual feedback object 222, as visual feedback object 222 represents source object 221.

According to the embodiment, a data payload of source object 221 is used to display target object 224 within visualization component 210 using a format specified by visualization component 220, and target object 224 has a distinct appearance as compared to visual feedback object 222, which is displayed using a format specified by web component 220. For example, as illustrated in FIG. 9, target object 224 is displayed as a visual icon that represents an employee of a company, rather than a spreadsheet record that represents an employee. As can be seen in the illustrated embodiment of FIG. 10, target object 224 includes a data payload of source object 221, and thus, is similar to source object 221. However, target object 224 is displayed within visualization component 220 in the graphical user interface.

According to an embodiment, it is determined whether drop target 223 can accept a drop of visual feedback object 222 using a communication component of web application 200. Also according to the embodiment, the data payload of source object 221 is transferred to drop target 223 using the communication component of web application 200. In one embodiment, the communication component is a JavaScript interface. Additionally, in an embodiment, once the data payload of source object 221 is transferred to drop target 223, web application 200 can create a data payload object (not shown), where the data payload object includes a data payload of source object 221. Also, once the data payload of source object 221 is transferred to drop target 223, web application 200 can create and display additional context object 225 within the graphical user interface of the web browser, where additional context object 225 includes additional context of source object 221.

However, if web application 200 cannot accept a drop of visual feedback object 222 at drop target 223, then, in the embodiment, the drag operation of source object 221 is cancelled. According to the embodiment, when the drag operation of source object 221 is cancelled, source object 221 remains displayed within web component 220 in the graphical user interface of the web browser, and the displaying of visual feedback object 222 is cancelled so that visual feedback object 222 is no longer displayed in the graphical user interface.

In an alternate embodiment, the drag and drop operation described in relation to FIGS. 3, 8, and 9 can be utilized to perform a drag and drop operation of an object from a first visualization component of a web application to a second visualization component of the web application. According to the embodiment, the drag and drop operation includes an initiation of a drag operation within the first visualization component, as described in relation to FIG. 3, a drag operation from the first visualization component to the second visualization component, as described in relation to FIG. 8, and a drop operation within the second visualization component, as described in relation to FIG. 9.

Figure 10:
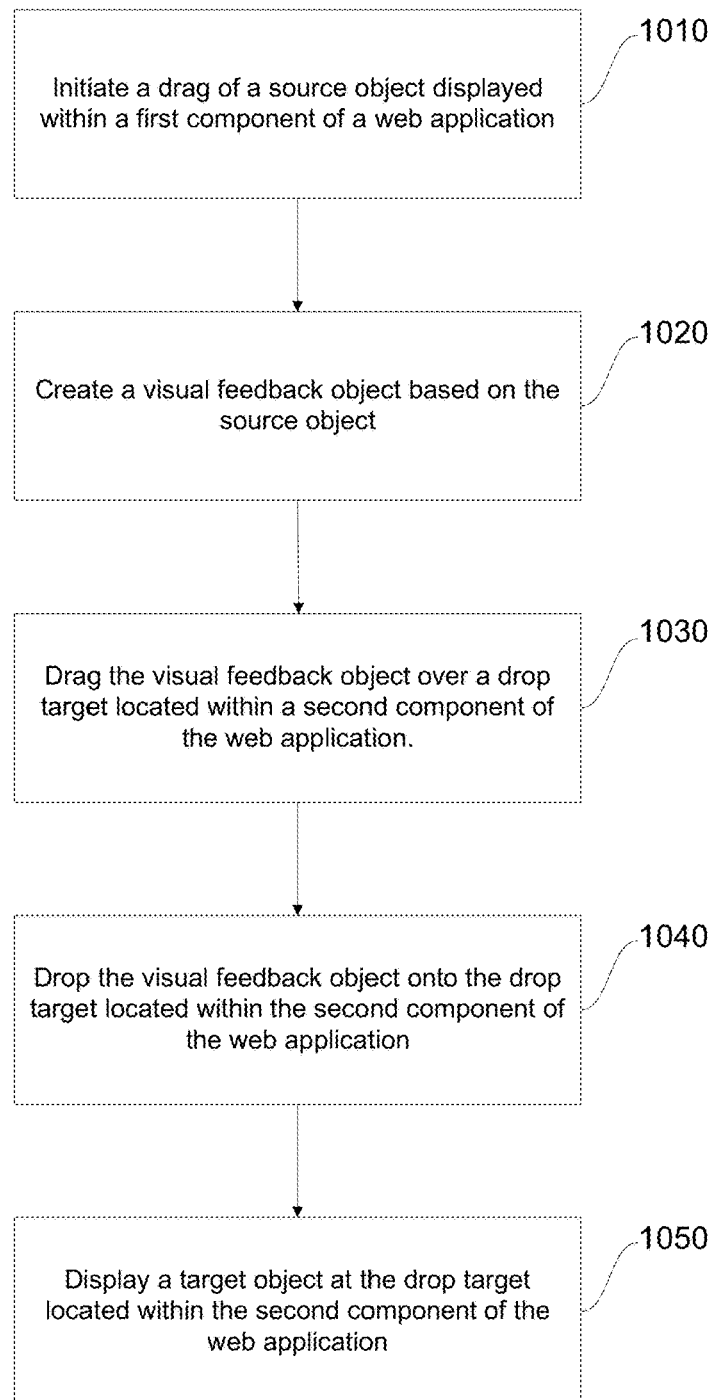
FIG. 10 illustrates a flow diagram of the functionality of a drag and drop module according to an embodiment of the invention.

FIG. 10 illustrates a flow diagram of the functionality of a drag and drop module according to an embodiment of the invention. In one embodiment, the functionality of the flow diagram of FIG. 10 is implemented by software stored in memory or other computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software.

According to an embodiment, at 1010, a drag of an object displayed within a first component of a web application is initiated. According to the embodiment, the drag is initiated in response to a first event received by the web application. In one embodiment, at 1020, a visual feedback object is created based on the source object. At 1030, the visual feedback object is dragged over a drop target located within a second component of the web application. According to the embodiment, the visual feedback object is dragged in response to one or more second events received by the web application. At 1040, the visual feedback object is dropped onto the drop target located within the second component of the web application. According to the embodiment, the visual feedback object is dropped in response to a third event received by the web application. At 1050, a target object is displayed at the drop target located within the second component of the web application. In accordance with the embodiment, one of the first and second components is a web component, and the other component is a visualization component. The first and second components of the web application communicate with each other using a communication component of the web application, according to the embodiment. According to one embodiment, the web component is a dynamic hypertext markup language component and the visualization component is an Adobe Flash® component.

In one embodiment, where the first component is a visualization component, and the second component is a web component, creating the visual feedback object based on the source object can include converting the source object which is an object within the visualization component, into a bitmap object and transferring the bitmap object to the web component using the communication component. In an alternate embodiment, creating the visual feedback object based on the source object can include converting the source object into an encoded string, creating a second visualization component that is displayed over the original visualization component, and transferring the encoded string into the second visualization component, which renders the visual feedback object, using the communication component. In an embodiment, the communication component is a JavaScript interface.

In an alternate embodiment, where the first component is a web component, and the second component is a visualization component, dragging the visual feedback object over a drop target located within the visualization component can include continuously determining whether the web application can accept a drop of the visual feedback object at its current position in response to the one or more second events received by the web application. In one embodiment, when a position of the visual feedback object is within the visualization component, the web application can utilize the communication component in order to determine whether the web application can accept a drop of the visual feedback object at a location within the visualization component. In one embodiment, the web application can transmit data from the web component to the visualization component, using the communication component, to determine whether the web application can accept a drop of the visual feedback object at a location within the visualization component. Such data can include a data payload of the source object in accordance with one embodiment of the invention. According to an embodiment, the communication component can be a JavaScript interface.

In the embodiment where the first component is a web component, and the second component is a visualization component, dropping the visual feedback object onto the drop target located within the visualization component of the web application can include determining whether the drop target can accept a drop of the visual feedback object based on a data payload of the source object. If the web application can accept a drop of the visual feedback object at the drop target, then a data payload of the source object is transferred to the drop target, the displaying of the source object and the visual feedback object is cancelled so that the source object and the visual feedback object are no longer displayed in the graphical user interface of the web browser, and the target object is displayed within the visualization component in the graphical user interface. According to one embodiment, it is determined whether the drop target can accept a drop of the visual feedback object using the communication component of the web application. Also according to the embodiment, the data payload of the source object is transferred to the drop target using the communication component of the web application. In one embodiment, the communication component can be a JavaScript interface.

Figure 11:
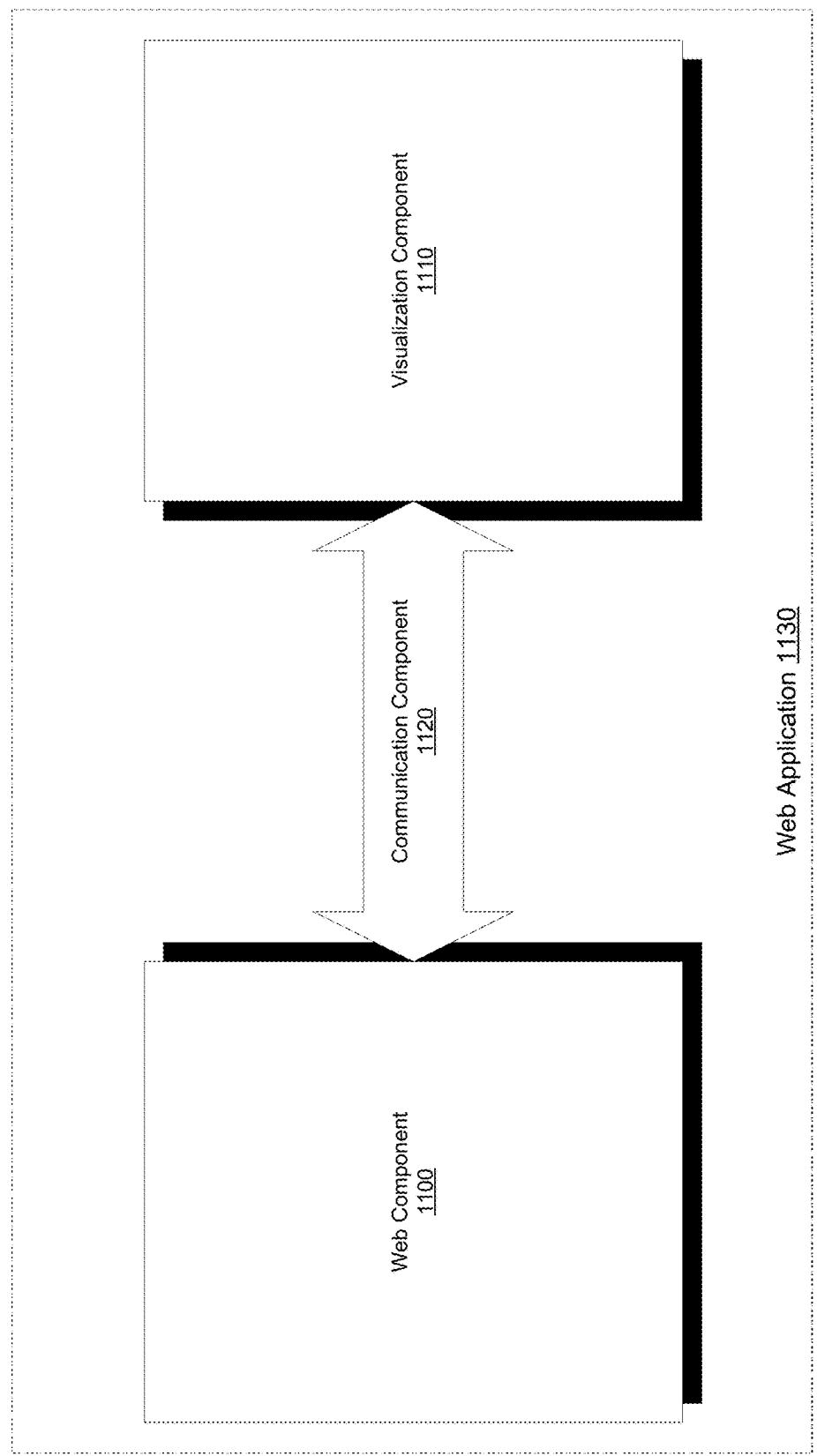
FIG. 11 illustrates a web component of a web application that interacts with a visualization component of the web application utilizing a communication component, according to an embodiment of the invention.

FIG. 11 illustrates a web component 1100 of a web application 1130 that interacts with a visualization component 1110 of web application 1130 utilizing a communication component 1120, according to an embodiment of the invention. According to the embodiment, communication component 1120 can act as a bridge between web component 1100 and visualization component 1110. Thus, web component 1100 can transmit data to, and receive data from, visualization component 1110 using communication component 1120, and vice-versa. According to an embodiment, a communication component is a JavaScript interface. However, this is merely an example, and, in alternate embodiments, a communication component can be any kind of interface.

Web component 1100 can transmit and receive different kinds of data to and from visualization component 1110 using communication component 1120 according to alternate embodiments. In one embodiment, the data can include a bitmap object. The bitmap object can be an inline image of an object of web component 1100, or an object of visualization component 1110, such as a base 64 PNG image. In another embodiment, the data can include an encoded string, such as a string that describes one or more data payload properties of an object of web component 1100, or an object of visualization component 1110. In either embodiment, the data can include a data payload. As previously described, a data payload can include data associated with an object of web application 1130, such as an object of web component 1100, or an object of visualization component 1110.

Thus, according to an embodiment, a web application that includes two or more components can provide a user with a drag and drop operation. Thus, application developers will not be required to sacrifice an ability to provide drag and drop functionality in exchange for providing a web application that includes two or more components. Accordingly, application developers can develop web applications that utilize drag and drop operations, with the knowledge that the web application will continue to provide drag and drop functionality, even if components such as visualization components are added to the web application.

The features, structures, or characteristics of the invention described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A non-transitory computer-readable medium having instructions stored thereon that, when executed by a processor, cause the processor to perform a drag and drop operation within a web application displayed in a graphical user interface of a web browser, the web application comprising two or more different components, the performing the drag and drop operation comprising:
    initiating a drag of a source object displayed within a visualization component of the web application that is displayed within the graphical user interface of the web browser in response to a first event received by the web application, wherein the visualization component displays the source object as a visual icon that represents an underlying data payload;
    creating and displaying a visual feedback object that comprises information used to display the source object in the web application;
    dragging the visual feedback object from within the visualization component over a drop target located within a web component of the web application that is displayed within the graphical user interface of the web browser in response to one or more second events received by the web application, wherein the drop target is within a region that is displayed within the graphical user interface of the web browser, the source object remaining within the visualization component during the dragging of the visual feedback object, wherein the web component displays a plurality of textual records;
    transferring the underlying payload data associated with, but separate from, the source object from the visualization component to the web component using a communication component of the web application when the visual feedback object is displayed within the web component; and
    dropping the visual feedback object onto the drop target located within the web component of the web application displayed within the graphical user interface of the web browser in response to a third event received by the web application and,
    the dropping including:
        extracting and displaying the data payload from the source object within the web component, wherein the data payload is displayed as a new textual record of the plurality of textual records within the web component; and
        deleting the source object and the visual feedback object from the graphical user interface.

2. The non-transitory computer-readable medium of claim 1, wherein the web component comprises a dynamic hypertext markup language component, and the visualization component comprises a multimedia component that comprises at least one of a Flash component, a Silverlight component, a Java applet component, a Scalable Vector Graphics component or a Synchronized Multimedia Integration Language component.

3. The non-transitory computer-readable medium of claim 2, wherein the communication component comprises a JavaScript interface.

4. The non-transitory computer-readable medium of claim 1,
    wherein the creating the visual feedback object further comprises converting an image object of the visualization component into an encoded string and transferring the encoded string to the web component using the communication component of the web application.

5. The non-transitory computer-readable medium of claim 1, wherein the creating the visual feedback object further comprises converting an image object of the visualization component into a bitmap object and transferring the bitmap object to the web component using the communication component of the web application.

6. The non-transitory computer-readable medium of claim 1, wherein the dragging the visual feedback object further comprises:
    continuously updating a position of the visual feedback object displayed in the web application in response to the one or more second events;
    continuously determining whether the web application can accept a drop of the visual feedback object at the position of the visual feedback object in response to the one or more second events; and
    displaying additional feedback in the web application that indicates whether the web application can accept a drop of the visual feedback object.

7. The non-transitory computer-readable medium of claim 1, wherein the dropping the visual feedback object further comprises:
    determining whether the web application can accept a drop of the visual feedback object at a position of the visual feedback object;
    when it is determined that the web application can accept the drop of the visual feedback object at the position and the visual feedback object is dropped at the position:
        transferring the data payload from the visual feedback object to the drop target and displaying the target object at the drop target; and
    when it is determined that the web application cannot accept the drop of the visual feedback object at the position and the visual feedback object is dropped at the position:
        cancelling the drag and drop operation;
        deleting the visual feedback object from the web application; and
        maintaining the source object within the visualization component.

8. A computer-implemented method for performing a drag and drop operation within a web application displayed in a graphical user interface of a web browser, the web application comprising two or more different components, the computer-implemented method comprising:

initiating a drag of a source object displayed within a visualization component of the web application that is displayed within the graphical user interface of the web browser in response to a first event received by the web application, wherein the visualization component displays the source object as a visual icon that represents an underlying data payload;

creating and displaying a visual feedback object that comprises information used to display the source object in the web application;

dragging the visual feedback object from within the visualization component over a drop target located within a web component of the web application that is displayed within the graphical user interface of the web browser in response to one or more second events received by the web application, wherein the drop target is within a region that is displayed within the graphical user interface of the web browser, the source object remaining within the visualization component during the dragging of the visual feedback object, wherein the web component displays a plurality of textual records;

transferring the underlying payload data associated with, but separate from, the source object from the visualization component to the web component using a communication component of the web application when the visual feedback object is displayed within the web component;

dropping the visual feedback object onto the drop target located within the web component of the web application displayed within the graphical user interface of the web browser in response to a third event received by the web application and in response displaying a corresponding target object comprising a textual representation of the data payload, the dropping including:
extracting and displaying the data payload from the source object within the web component, wherein the data payload is displayed as a new textual record of the plurality of textual records within the web component; and
deleting the source object and the visual feedback object from the graphical user interface.

9. The computer-implemented method of claim 8, wherein the creating the visual feedback object further comprises converting an image object of the visualization component into an encoded string and transferring the encoded string to the web component using the communication component of the web application.

10. A system comprising:
a memory configured to store a collection of software modules; and
a processor configured to execute the collection of software modules stored on the memory;
wherein the processor is further configured, when executing the collection of software modules stored on the memory, to:
initiate a drag of a source object displayed within a visualization component of a web application that is displayed within a graphical user interface of a web browser in response to a first event received by the web application, wherein the visualization component displays the source object as a visual icon that represents an underlying data payload;
create and display a visual feedback object that comprises information used to display the source object in the web application;
drag the visual feedback object from within the visualization component over a drop target located within a web component of the web application that is displayed within the graphical user interface of the web browser in response to one or more second events received by the web application, wherein the drop target is within a region that is displayed within the graphical user interface of the web browser, the source object remaining within the visualization component during the dragging of the visual feedback object, wherein the web component displays a plurality of textual records;
transfer the underlying payload data associated with, but separate from, the source object from the visualization component to the web component using a communication component of the web application when the visual feedback object is displayed within the web component; and
drop the visual feedback object onto the drop target located within the web component of the web application displayed within the graphical user interface of the web browser in response to a third event received by the web application and in response displaying a corresponding target object comprising a textual representation of the data payload;
the drop including:
extracting and displaying the data payload from the source object within the web component, wherein the data payload is displayed as a new textual record of the plurality of textual records within the web component; and
deleting the source object and the visual feedback object from the graphical user interface.

11. The system of claim 10,
wherein the create the visual feedback object further comprises converting an image object of the visualization component into an encoded string and transferring the encoded string to the web component using the communication component of the web application.

12. The non-transitory computer-readable medium of claim 1, wherein the target object has an appearance or format in the graphical user interface that is different than either the source object or the visual feedback object.

13. The method of claim 8, wherein the web component comprises a dynamic hypertext markup language component, and the visualization component comprises a multimedia component that comprises at least one of a Flash component, a Silverlight component, a Java applet component, a Scalable Vector Graphics component or a Synchronized Multimedia Integration Language component.

14. The method of claim 8, wherein the communication component comprises a JavaScript interface.

15. The method of claim 8, wherein the creating the visual feedback object further comprises converting an image object of the visualization component into a bitmap object and transferring the bitmap object to the web component using the communication component of the web application.

16. The system of claim 10, wherein the web component comprises a dynamic hypertext markup language component, and the visualization component comprises a multimedia component that comprises at least one of a Flash component, a Silverlight component, a Java applet component, a Scalable Vector Graphics component or a Synchronized Multimedia Integration Language component.

17. The system of claim 10, wherein the communication component comprises a JavaScript interface.

18. The system of claim 10, wherein the create the visual feedback object further comprises converting an image object of the visualization component into a bitmap object and transferring the bitmap object to the web component using the communication component of the web application.

* * * * *

UNITED STATES PATENT AND TRADEMARK OFFICE
CERTIFICATE OF CORRECTION

PATENT NO. : 10,048,854 B2
APPLICATION NO. : 13/017286
DATED : August 14, 2018
INVENTOR(S) : Zhang et al.

Page 1 of 1

It is certified that error appears in the above-identified patent and that said Letters Patent is hereby corrected as shown below:

On the Title Page

On page 3, Column 2, under Other Publications, Line 12, delete "29," and insert -- 28, --, therefor.

On page 3, Column 2, under Other Publications, Line 19, delete ".corm/" and insert -- .com/ --, therefor.

Signed and Sealed this
Fourth Day of June, 2019

Andrei Iancu
*Director of the United States Patent and Trademark Office*